__Patented Sept. 19, 1950__

UNITED STATES PATENT OFFICE 2,522,680

POLYMERIZABLE DIOXOLANE COMPOUND, PRODUCTS PREPARED THEREFROM, AND METHODS OF PREPARATION

Edward L. Kropa, Old Greenwich, and Walter M. Thomas, Springdale, Conn., assignors to American Cyanamid Company, New York, N. Y., a corporation of Maine No Drawing. Application July 20, 1949, Serial No. 105,898

16 Claims. (Cl. 260—85.5)

This invention relates to a new polymerizable dioxolane compound, to polymerization products prepared therefrom and to methods of preparing the said compound and products. More particularly the invention is concerned with 4-allyloxymethyl-2-oxo-1,3-dioxolane and with the production of polymers (homopolymers) and copolymers (or interpolymers) therefrom. The scope of the invention includes polymerizable compositions comprising (1) 4-allyloxymethyl-2-oxo-1,3-dioxolane and (2) a compound which is different from the compound of (1), is copolymerizable therewith and which contains a $CH_2=C<$ grouping, as well as compositions comprising a copolymer of copolymerizable ingredients including as essential components the aforementioned compounds of (1) and (2).

4-allyloxymethyl-2-oxo-1,3-dioxolane, which also may be named 4-allyloxymethyl-1,3-dioxolan-2-one, 4-allyloxymethyl-2-keto-1,3-dioxolane, or 4-alloxymethyl-2-oxo-1,3-dioxolane, is a new chemical compound having the formula I 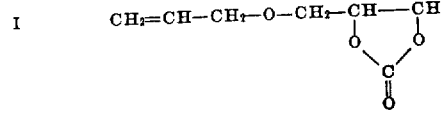

It can be prepared, for example, by effecting reaction under heat between glycerol-α-allyl ether and diethyl carbonate in the presence of a catalyst for the reaction, e. g., metallic sodium (preferably in small pieces or shavings) or other alkali metal, or an alkoxide of an alkali metal such, for instance, as sodium methoxide, sodium ethoxide, etc. 4-allyloxymethyl-2-oxo-1,3-dioxolane also can be prepared by effecting reaction between glycerol-α-allyl ether and phosgene, in which case HCl is evolved as a by-produce of the reaction.

Many different allyl compounds were known prior to our invention, but to the best of our knowledge and belief 4-allyloxymethyl-2-oxo-1,3-dioxolane heretofore has been unknown. This compound is unique in that it can be caused to polymerize either through the ethylenically unsaturated bond of the compound or through both the unsaturated linkage and the dioxolane ring. By suitable choice of catalysts, polymerization can be caused to take place primarily through the ring. Because of its unique structure and properties, the plastics chemist and resin formulator, and workers in related arts, are now provided with a single polymerizable material which, alone or admixed with another comonomer, can be caused to undergo either or both of two types of polymerization reactions as briefly described above. The advantages of such a polymerizable compound will be apparent to those skilled in the art, for example, the greater adaptability of such compounds for a greater variety of service applications by merely varying the catalyst or other polymerization influences employed, or the temperature or other polymerization conditions used, so as to direct the course of the polymerization through the ethylenic linkage and/or the dioxolane grouping as desired or as conditions may require.

The unsaturated dioxolane of this invention can be caused to polymerize alone or while admixed with one or more (e. g., two, three, five, ten or any desired number) of other comonomers which are copolymerizable therewith, more particularly such comonomers which contain a $CH_2=C<$ grouping (that is, comonomers which contain either a single $CH_2=C<$ grouping or a plurality of such groupings, e. g., two, three, five or any higher number of such groupings), thereby to obtain homopolymers and copolymers, which in general are resinous or potentially resinous materials and which are especially valuable for use in the plastics, coating, laminating, adhesive, molding and other arts. Examples of comonomers with which our new unsaturated dioxolane can be copolymerized are vinyl compounds, more particularly vinyl aromatic compounds (e. g., styrene, dimethylstyrene and other vinyl aromatic hydrocarbons) and vinyl aliphatic compounds, for instance acrylonitrile, acrylamide, the alkyl esters of acrylic acid (e. g., methyl, ethyl, propyl, etc., acrylates), the various allyl esters, e. g., allyl acetate, diallyl phthalate, diallyl succinate, etc.

It is an object of the present invention to provide a new polymerizable monomer, more particularly an unsaturated dioxolane and specifically 4-allyloxymethyl-2-oxo-1,3-dioxolane.

Another object of the present invention is to provide a new class of polymerizable compositions containing 4-allyloxymethyl-2-oxo-1,3-dioxolane and one or more other comonomers copolymerizable therewith, and a new class of copolymer compositions from the said polymerizable compositions.

Another object of the invention is to provide a new class of synthetic compositions, more particularly resinous polymers and copolymers, which are especially suitable for use in the plastics, coating, adhesive, laminating, molding and other arts.

Other objects of the invention will be apparent to those skilled in the art from the following more detailed description thereof.

The foregoing objects are attained by preparing the new chemical compound 4-allyloxymethyl-2-oxo-1,3-dioxolane and then polymerizing this compound either alone or while admixed with one or more other comonomers which are copolymerizable therewith, more particularly such comonomers which contain either a single or a plurality of $CH_2=C<$ groupings.

The preparation of 4-allyloxymethyl-2-oxo-1,3-dioxolane by reaction between glycerol-α-allyl ether and phosgene is illustrated by the following equation:

II

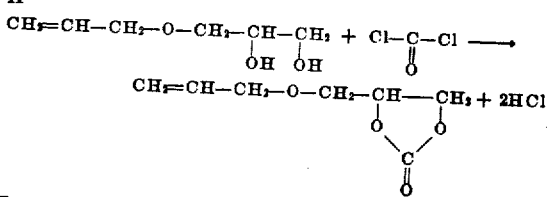

In carrying out this reaction the glycerol-α-allyl ether and a solvent which is inert to phosgene both initially and as the reaction proceeds (e. g., benzene, toluene, xylene, etc.) are charged to a suitable reaction vessel. The chosen inert solvent need not be miscible with the glycerol-α-allyl ether. Any suitable amount of solvent can be employed, but generally it constitutes from about 50% to about 90% by weight of the mixture thereof with the glycerol-α-allyl ether. The mixture is stirred and maintained at from about 10° C. to about 40° C., preferably at about 25°–30° C., while passing in the phosgene. External cooling is usually necessary in order to maintain this temperature. This can be done, for instance, by means of an ice bath or by any other suitable means. After about 1 mole of phosgene per mole of glycerol-α-allyl ether has been reacted with or absorbed by the said ether, the addition of phosgene is discontinued and the reaction mass is stirred at the same temperature for from about 1 to 3 or more hours, as required. Heat is then applied, and the temperature is raised to about 80°–90° C. for about 1 hour. The solvent and any excess phosgene are removed by distillation at atmospheric pressure. 4-allyloxymethyl-2-oxo-1,3-dioxolane is recovered as a distillate by vacuum distillation. Prior to vacuum distillation, the residue remaining after removal of the solvent and any excess phosgene may be given, if desired, an alkaline wash (e. g., with a dilute aqueous solution of sodium hydroxide or carbonate), followed by drying, e. g., over calcium chloride.

The preparation of 4-allyloxymethyl-2-oxo-1,3-dioxolane by effecting reaction between glycerol-α-allyl ether and diethyl carbonate is illustrated by the following equation:

III

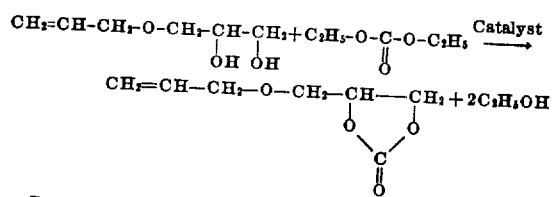

In carrying out this reaction the glycerol-α-allyl ether and diethyl carbonate in equal molar proportions or, preferably, using a small molar excess (e. g., from 5 to 20 mole per cent in excess) of the latter are mixed in a reaction vessel provided with a stirrer and a short fractionating column. A small amount (e. g., from 0.2 to 2% by weight of the total reactants) of a suitable catalyst (e. g., metallic sodium, sodium methoxide or others such as have been mentioned hereinbefore) is added to the mixed reactants, and the reaction vessel is heated in an oil bath maintained at about 150° C. The temperature of the reaction mass rises to about 110° C., then begins to fall as the reaction starts. Ethyl alcohol is evolved and is removed from the top of the column, the reflux being adjusted so that the temperature at the head is 78°–80° C. and very little diethyl carbonate escapes. The temperature of the reaction mass drops to about 90°–96° C., and then slowly rises as the temperature of the oil bath is raised to 170°–180° C. When approximately 2 molar proportions of ethanol have been removed, 4-allyloxymethyl-2-oxo-1,3-dioxolane is separated from the reaction mass by vacuum distillation. Alternatively, the reaction mass prior to vacuum distillation can be mixed with a solvent (e. g., benzene), and the resulting solution then washed with water to remove the water-soluble catalyst and unreacted glycerol-α-allyl ether. However, it is not always desirable to follow this procedure since troublesome emulsions often ensue.

Any of the alkali metals (sodium, potassium, lithium, caesium or rubidium) or alkoxides thereof (e. g., methoxides, ethoxides, propoxides, n-butoxides, sec.-butoxides, tert.-butoxides, amoxides, hexoxides, heptoxides, octoxides, decoxides, etc., or mixtures of any of the alkali metals, or of any of the alkali-metal alkoxides, or mixtures of any of the alkali metals with any of the alkali-metal alkoxides, can be used as the catalyst for the reaction. Other strong bases also may be employed.

In producing the polymerization products of our invention, the unsaturated dioxolane can be polymerized alone but it is preferably polymerized while admixed with a comonomer (or a plurality of comonomers) containing one or more $CH_2=C<$ groupings since, in general, products having optimum properties for a particular service use thereby can be obtained at minimum cost. Heat, light or heat and light can be used to effect polymerization, although under such conditions the rate of polymerization is relatively slow. Hence, to accelerate the polymerization, we prefer to use a polymerization catalyst accompanied by heat, light or heat and light. Further details on polymerization conditions are given hereinafter.

Examples of monomers containing a $CH_2=C<$ grouping that can be copolymerized with 4-allyloxymethyl-2-oxo-1,3-dioxolane singly or a plurality (two, three, four or any desired number) thereof, the latter often being desirable in order to improve the compatibility and copolymerization characteristics of the mixture of monomers and to obtain new and valuable copolymers having the particular properties desired for a particular service application, are such monomers as the unsaturated alcohol esters, more particularly the allyl, methallyl, crotyl, 1-chloroallyl, 2-chloroallyl, cinnamyl, vinyl, methvinyl, 1-phenylallyl, butenyl, etc., esters of saturated and unsaturated, aliphatic and aromatic, monobasic and polybasic acids such, for instance, as acetic, propionic, butyric, valeric, caproic, acrylic and alpha-substituted acrylic (including alkacrylic, e. g., methacrylic, ethacrylic, propacrylic, etc., and arylacrylic, e. g., phenylacrylic, etc.), crotonic, oxalic, malonic, succinic, glutaric, adipic, pimelic, suberic, azelaic, sebacic, fumaric, citraconic, mesaconic, itaconic, acetylene dicarboxylic, aconitic, benzoic, phenylacetic, phthalic, terethalic, benzoylphthalic, etc., acids; the saturated monohydric alcohol esters, e. g., the methyl, ethyl, propyl, isopropyl, butyl, sec.-butyl, amyl, etc., esters of unsaturated aliphatic monobasic and polybasic acids, illustrative examples of which appear above; vinyl cyclic compounds (including monovinyl aromatic hydrocarbons), e. g., styrene, o-, m- and p-chlorostyrenes, -bromostyrenes, -fluorostyrenes, -methylstyrenes, -ethylstyrenes, -cyanostyrenes, the various poly-substituted styrenes such, for example, as the various di-, tri- and tetra-chlorostyrenes, -bromostyrenes, -fluorostyrenes, -methylstyrenes, -ethylstyrenes, -cyanostyrenes, etc., vinyl naphthalene, vinylcyclohexane, vinyl furane, vinyl pyridine, vinyldibenzofuran, divinyl benzene, trivinyl benzene, allyl benzene, diallyl benzene, N-vinyl carbazole, the various allyl cyanostyrenes, the various alpha-substituted styrenes and alpha-substituted ring-substituted styrenes, e. g., alpha-methyl styrene, alpha-methyl-para-methyl styrene, etc.; unsaturated ethers, e. g., ethyl vinyl ether, diallyl ether, ethyl methallyl ether, etc.; unsaturated amides, for instance N-allyl caprolactam, acrylamide, and N-substituted acrylamides, e. g., N-methylol acrylamide, N-allyl acrylamide, N-methyl acrylamide, N-phenyl acrylamide, etc.; unsaturated ketones, e. g., methyl vinyl ketone, methyl allyl ketone, etc.; methylene malonic esters, e. g., methylene methyl malonate, etc.; butadienes, e. g., 1,3-butadiene, 2-chlorobutadiene, etc.; unsaturated polyhydric alcohol (e. g., butenediol, etc.) esters of saturated and unsatuarted, aliphatic and aromatic, monobasic and polybasic acids, illustrative examples of which appear above.

Other examples of monomers that can be copolymerized with 4-allyloxymethyl-2-oxo-1,3-dioxolane are the vinyl halides, more particularly vinyl fluoride, vinyl chloride, vinyl bromide and vinyl iodide, and the various vinylidene compounds, including the vinylidene halides, e. g., vinylidene chloride, vinylidene bromide, vinylidene fluoride and vinylidene iodide, other comonomers being added if needed in order to improve the compatibility and copolymerization characteristics of the mixed monomers.

Other and more specific examples of monomeric materials which can be mixed or blended with the unsaturated dioxolane used in practicing our invention and the resulting homogeneous or substantially homogeneous, polymerizable composition then polymerized, as hereinafter more fully described, to yield new and valuable copolymer compositions are the allyl compounds which are different from 4-allyloxymethyl-2-oxo-1,3-dioxolane and especially those which have a boiling point of at least about 60° C. Of the monomeric materials which may be used the allyl esters form a large class, all of which are suitable. The reactive allyl compounds employed are preferably those which have a high boiling point such, for example, as diallyl maleate, diallyl fumarate, diallyl phthalate, diallyl succinate, etc. Other allyl compounds which are not necessarily high boiling also may be used.

More specific examples of allyl compounds that can be copolymerized with 4-allyloxymethyl-2-oxo-1,3-dioxolane are allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl azelate, diallyl sebacate, diallyl tartronate, diallyl tartrate, diallyl mesaconate, diallyl citraconate, the diallyl ester of muconic acid, diallyl itaconate, diallyl chlorophthlate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetrallyl silane, tetrallyl silicate, hexallyl disiloxane, etc. Other examples of allyl compounds that may be employed are given, for example, in the copending application of Edward L. Kropa, Serial No. 700,833, filed October 2, 1946, now Patent No. 2,510,503, issued June 6, 1950.

Among the comonomers which are preferred for use in carrying our invention into effect are the vinyl compounds, including the vinyl aromatic compounds, more particularly the vinyl aromatic hydrocarbons (e. g., styrene, isopropenyl toluene, the various dialkyl styrenes, etc.), and the vinyl aliphatic compounds, e. g., acrylonitrile, acrylamide, etc., and other compounds containing a $CH_2=C<$ grouping, e. g., the various substituted acrylonitriles (e. g., methacrylonitrile, ethacrylonitrile, phenylacrylonitrile, etc.), the various substituted acrylamides (e. g., methacrylamide, ethacrylamide, the various N-substituted acrylamides and alkacrylamides, for instance, N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the methyl, ethyl, propyl, isopropyl, n-butyl, isobutyl, sec.-butyl, tert.-butyl, amyl, hexyl, heptyl, octyl, decyl, dodecyl, etc., esters of acrylic, methacrylic, ethacrylic, phenylacrylic, etc., acids, including the alkyl acrylates containing not more than four carbon atoms in the ester grouping, examples of which are given above, as well as other vinyl aromatic and vinyl aliphatic compounds, and other compounds containing a $CH_2=C<$ grouping.

Any suitable means may be used in effecting polymerization of the 4-allyloxymethyl-2-oxo-1,3-dioxolane alone or admixed with one or more other monomers which are copolymerizable therewith. Heat or light or both, with or without a polymerization catalyst, can be used. Ultraviolet light is more effective than ordinary light. Preferably a polymerization catalyst is employed. Any of the catalysts which are useful in accelerating the polymerization of compounds containing an ethylenically unsaturated grouping, specifically a vinyl grouping can be used. Among the preferred catalysts are: the acidic peroxides, e. g., benzoyl peroxide, phthalic peroxide, succinic peroxide and benzoyl acetic peroxide, as well as fatty oil acid peroxides, e. g., coconut oil acid peroxides, lauric peroxide, stearic peroxide and oleic peroxide; alcoholic peroxides, e. g., tert.-butyl hydroperoxide; and terpene oxides, e. g., ascaridole. Other examples of organic peroxide catalysts that can be employed are the following:

Tetralin hydroperoxide
Tert.-butyl diperphthalate
Cumene hydroperoxide
Tert.-butyl perbenzoate
Acetyl peroxide
2,4-dichlorobenzoyl peroxide
Urea peroxide
Caprylyl peroxide
p-Chlorobenzoyl peroxide
Di-tert.-butyl peroxide
2,2-bis(di-tert.-butyl peroxy)butane
Hydroxyheptyl peroxide
Diperoxide of benzaldehyde Examples of catalysts which are believed to accelerate polymerization primarily by opening up the dioxolane ring and, also, may cause polymerization to proceed through the ethylenically unsaturated grouping are: p-toluene sulfonic acid, sulfuric acid, phosphoric acid, aluminum chlordie, stannic chloride, ferric chloride, boron trifluoride-ethyl ether complex, iodine, etc. Certain alkaline catalysts also seem to function in a similar manner, e. g., ethylene diamine, tetraethylenepentamine, etc.

Catalysts which accelerate polymerization as the result of the liberation of a free radical, e. g., sym.-dicyanotetramethylazomethane and similar known diazo polymerization catalysts, also can be employed.

If desired, partial polymerization of the unsaturated dioxolane can be effected with the aid of one polymerization catalyst (e. g., a peroxide and, more particularly, an organic peroxide catalyst, or with a diazo or other type of catalyst capable of liberating a free radical) and polymerization then completed with the aid of a catalyst capable of opening up the dioxolane ring, e. g., stannic chloride, etc.

The concentration of catalyst is relatively small, e. g., from, by weight, about 1 part of catalyst per thousand parts of the monomer or mixture of monomers to be polymerized to about 3 or 4 or more parts of catalyst per hundred parts of the monomer or mixture of monomers. If an inhibitor be present in the polymerizable composition, up to 6 or 7% or even more, based on the weight of the said composition, may be necessary (according to the concentration of the inhibitor) in order to overcome the effect of the inhibitor and to cause polymerization to proceed as desired within a reasonable period of time.

The proportions of the unsaturated dioxolane and monomeric material which is copolymerized therewith may be carried as desired or as conditions may require, but ordinarily the proportions thereof in the polymerizable mixture will be within the range of, by weight, from 3 (about 3) to 97 (about 97), or higher, molar per cent of the unsaturated dioxolane to from 97 (about 97) to 3 (about 3), or lower, molar per cent of the other comonomer. Preferably the unsaturated dioxolane constitutes at least 5 molar per cent of the mixture thereof with the other comonomer or mixture of comonomers. When the comonomer constitutes only about 3 molar per cent by weight of the polymerizable composition and the unsaturated dioxolane constitutes the remainder, the changes in the properties of the polymerization product are less marked (as compared with homopolymeric 4-allyloxymethyl-2-oxo-1,3-dioxolane) than when the comonomer (or mixture of comonomers) constitutes a substantially larger amount, as for example 10 or 20 molar per cent or even as much as 30 or 40 molar per cent by weight of the polymerizable composition. Particularly valuable copolymer compositions are obtained by using, by weight, from 50 to 90 molar per cent of the unsaturated dioxolane and from 10 to 50 molar per cent of a comonomer (or mixture of comonomers) which is copolymerizable therewith and which contains a $CH_2=C<$ grouping, numerous examples of which have been given hereinbefore.

In some cases it may be desirable to incorporate into the polymerizable composition (especially those comprising the unsaturated dioxolane and one or more comonomers) an inhibitor which is adapted to inhibit polymerization through the ethylenically unsaturated grouping of the monomeric material. When it is desired to use the inhibitor-modified composition, a catalyst is added in an amount sufficient to promote the polymerization reaction. Various inhibitors can be used for this purpose, e. g., phenyl-α-naphthylamine, N,N'-di-2-naphthyl-p-phenylenediamine, certain cupric salts, e. g., cupric acetate, etc. The amount of inhibitor may be considerably varied but ordinarily it is employed in an amount not exceeding 3%, generally less than 1%, by weight of the polymerizable composition, e. g., from 0.01% to 0.5% or 0.6% by weight of the said composition.

The polymerization may be effected by conventional bulk polymerization technique, in the presence or absence of a solvent capable of dissolving the monomer (or mixture of monomers) and in which the latter preferably is inert; or by conventional emulsion polymerization or bead polymerization methods. Poilymerization of the monomer or mixture of monomers may be effected by a continuous process as well as by a batch operation. Thrus, the unsaturated dioxolane or mixture thereof with one or more other comonomers, to which has been added a small amount of a suitable polymerization catalyst, may be caused to polymerize to yield a homopolymer or heteropolymer by passage through a conduit with alternate hot and cool zones.

The temperature of polymerization of the polymerizable composition, at atmospheric or slightly above atmospheric pressure and in the presence or absence of a polymerization catalyst, may be varied over a wide range, up to and including or slightly above the boiling point at atmospheric pressure of the monomer or mixture of monomers. In most cases the polymerization temperature will be within the range of 15° to 200° C., more particularly within the range of 20° C. or 30° C. (ordinary room temperature) to 130°–140° C., depending, for example, upon the rapidity of polymerization (or copolymerization) wanted, the particular catalyst, if any, used, the particular mixture of comonomers employed when a copolymer is wanted, and other influencing factors. With certain polymerization catalysts, more particularly strong acidic polymerization catalysts such, for instance, as gaseous boron trifluoride, boron trifluoride-ethyl ether complex, concentrated sulfuric acid, anhydrous aluminum chloride, etc., a substantially lower polymerization temperature often advantageously can be used, e. g. temperatures ranging between −80° C. and 0° or 10° C. At the lower temperature below the solidification point of the monomeric composition, polymerization of the said composition is effected while it is dissolved or dispersed in a solvent or dispersion medium which is liquid at the polymerization temperature. Or, if desired, the monomeric composition may be polymerized in dissolved or dispersed state at temperatures above its solidification point or above the solidification point of copolymerizable components thereof. The polymerization product may be separated from the liquid medium in which polymerization (or copolymerization) was effected by any suitable means, e. g., by filtration, centrifuging, solvent extraction, etc.

The polymerizable compositions of our invention which are normally liquids may be cast at normal temperatures in film or bulk form. Upon being subjected to polymerization conditions as above described, hard films or massive castings are obtained.

In order that those skilled in the art better may understand how the present invention can be carried into effect, the following examples are given by way of illustration and not by way of limitation. All parts and percentages are by weight.

PREPARATION OF 4-ALLYLOXYMETHYL-2-OXO-1,3-DIOXOLANE

Example 1

|  | Parts | Approx. Molar Ratios |
|---|---|---|
| Glycerol-α-allyl ether | 211 | 1.0 |
| Diethyl carbonate | 228 | 1.2 |
| Metallic sodium (in the form of shavings) | 1 |  | are heated together in a reaction vessel provided with a stirrer, thermometer and Snyder column. The temperature of the reaction mass rises from 96° C. to 134° C. over a period of 80 minutes as the ethanol distills off. After about 155 parts of distillate (mainly ethanol) has been collected, the residue is distilled under vacuum to obtain 215 parts of 4-allyloxymethyl-2-oxo-1,3-dioxolane boiling at 138°–140° C. under a pressure of 3–4 mm. The density of the product at 25° C. is 1.159; $n_D^{25°}$ 1.4530; molecular refraction: 36.82 (calculated: 36.80).

Example 2

This example illustrates the preparation of 4-allyloxymethyl-2-oxo-1,3-dioxolane by a different method, namely, by reaction between glycerol-α-allyl ether and phosgene.

A reaction vessel equipped with a stirrer, thermometer and a gas-inlet tube extending to the bottom of the vessel is charged with 66 parts of glycerol-α-allyl ether and 250 parts of toluene, the two ingredients being miscible. The vessel and contents are tared, and then phosgene is passed into the mixture while it is being stirred. The mixture is at a temperature of 20° C. when the phosgene is first introduced, reaching a temperature of 28° C. in 23 minutes. At this point the reaction vessel is placed in a cold water bath in order to reduce the temperature of the reaction mass. After 45 minutes the mass is at a temperature of 24° C., and its increase in weight (from the reacted or absorbed phosgene) is 52 parts. The introduction of phosgene is now discontinued, and the reaction vessel is heated slowly on a steam bath to a temperature of 80° C. over a period of 1¾ hours. Heating of the mass is continued for an additional 1½ hours at 80°–89° C., with agitation, after which the vessel is removed from the steam bath, and air is bubbled through the reaction mass to remove any excess phosgene. The toluene is now distilled from the mass first at atmospheric pressure and then at a slightly reduced pressure. The bath temperature is increased to 210° C., and a distillate of clear liquid containing the 4-allyloxymethyl-2-oxo-1,3-dioxolane is collected as a fraction boiling at 130°–156° C. (mostly at 155° C.) under a pressure of 8 mm. in a yield amounting to 75 parts. Pure 4-allyloxymethyl-2-oxo-1,3-dioxolane is obtained by redistillation of this crude material.

PREPARATION OF POLYMERS AND COPOLYMERS OF 4-ALLYLOXYMETHYL-2-OXO-1,3-DIOXOLANE

Example 3

| | Parts |
|---|---|
| 4-allyloxymethyl-2-oxo-1,3-dioxolane | 20 |
| Benzoyl peroxide | 1 | are mixed together, and the resulting catalyzed monomer is heated for 72 hours at 70° C. to yield a clear, viscous polymer of 4-allyloxymethyl-2-oxo-1,3-dioxolane. The viscosity is substantially increased and a polymer of higher molecular weight is obtained by heating for an additional 17 hours at 120° C. When a small amount, e. g., 2–5%, by weight thereof of stannic chloride is added to the viscous polymer at 20°–30° C., a gel forms upon contact of the catalyst with the polymer indicating that the linear liquid polymer (wherein polymerization has taken place primarily through the ethylenic linkage) has been cross-linked through rupture of the dioxolane ring.

Example 4

| | Parts |
|---|---|
| 4-allyloxymethyl-2-oxo-1,3-dioxolane | 20.0 |
| Ethyl acrylate | 30.0 |
| Benzene | 50.0 |
| Benzoyl peroxide | 0.5 | are heated together under reflux at the boiling temperature of the mass for 5 hours. The resulting viscous solution containing a copolymer of ethyl acrylate and the aforementioned dioxolane is cooled, and the content of copolymer solids is determined by oven drying for 2 hours at 150° C. The yield of copolymer solids is 38.6%, which corresponds to 77.2% conversion of monomers to copolymer. Films dried from the benzene solution of the copolymer are clear and tough. The copolymer of this example is suitable for use as a component of coating compositions.

Instead of ethyl acrylate other comonomers, more particularly other esters of acrylic acid, e. g., methyl acrylate, propyl acrylate, isopropyl acrylate, n-butyl acrylate, isobutyl acrylate, sec.-butyl acrylate, tert.-butyl acrylate, amyl acrylate, hexyl acrylate, propenyl acrylate, cyclohexyl acrylate, phenyl acrylate, benzyl acrylate, etc., can be substituted in the above formulation thereby to obtain copolymer compositions of varying properties. As with ethyl acrylate, so too with such other comonomers the proportions of components can be varied as desired or as conditions may require, e. g., from 3 to 97 (or higher) molar per cent of the dioxolane to form 97 to 3 (or lower) molar per cent of the other comonomer. Preferably the comonomer constitutes from 5–10 to 95–90 molar per cent of the mixture thereof with the dioxolane.

Example 5

Same as in Example 4 with the exception that 0.5 part of sym.-dicyanotetramethylazomethane is used instead of 0.5 part of benzoyl peroxide. The yield of copolymer solids is 36.6%, which corresponds to 73.2% conversion of monomers to copolymer. The benzene solution of the copolymer likewise forms a clear, tough film upon drying.

Example 6

Same as in Example 4 with the exception that 50 parts of xylene is used in place of 50 parts of benzene, and 0.5 part of 2,2-bis(di-tertiary-butylperoxy)butane is employed instead of 0.5 part of benzoyl peroxide. The yield of copolymer solids is 39.1%, which corresponds to 78.2% conversion of monomers to copolymer. As in Examples 4 and 5, the xylene solution of the copolymer forms a clear, tough film upon drying.

Example 7

|  | Parts |
|---|---|
| Styrene | 180.0 |
| 4-allyloxymethyl-2-oxo-1,3-dioxolane | 20.0 |
| 25% solution of dioctyl sodium sulfosuccinate in water | 20.0 |
| Water | 580.0 |
| Ammonium persulfate | 0.1 | are charged to a 3-necked reaction vessel equipped with a stirrer and a reflux condenser. The mixture is stirred vigorously while heating on a steam bath for 80 minutes, at the end of which period refluxing has ceased. Steam is now passed through the emulsion for 15 minutes to remove residual monomers. A small amount of coagulated copolymer is filtered out of the stable emulsion of the copolymer of styrene and the aforementioned unsaturated dioxolane.

The copolymer latex may be used as a coating composition or as a component of such compositions. For example, it may be applied to a surface of glass, metal, wood or other material to be protectively finished, and the coated article then heated for from 1 to 3 hours at a temperature of the order of 120° C. to 140° C. to evaporate the water and to convert the reactive styrene-unsaturated dioxolane copolymer to a cured or substantially insoluble, substantially infusible state.

The copolymer may be precipitated, if desired, from the aqueous emulsion thereof by adding a coagulating agent such, for instance, as salts (e. g., salts of polyvalent metals such as aluminum sulfate, magnesium chloride, barium chloride, etc., salts of monovalent metals such as sodium chloride, sodium sulfate, etc.), acids, e. g., formic acid, acetic acid, phosphoric acid, hydrochloric acid, etc., sulfides, e. g., magnesium sulfide, etc. The coagulated copolymer is separated from the aqueous phase, water-washed, and freed from entrapped water, for example by working on rolls to press out the water, followed by drying at a suitable temperature (e. g., at room temperature) under atmospheric pressure (preferably in a stream of dry air) or at subatmospheric pressures to remove the last traces of water. The dried, reactive copolymer, alone or with a dye, pigment, filler, plasticizer, lubricant, polymerization catalyst or other modifying agent, may be molded under heat and pressure, e. g., at 140° C. to 170° C. and under a pressure of 2000 to 5000 pounds per square inch.

Example 8

|  | Parts |
|---|---|
| Acrylonitrile | 50.0 |
| 4-allyloxymethyl-2-oxo-1,3-dioxolane | 50.0 |
| 25% solution of dioctyl sodium sulfosuccinate | 12.0 |
| Water | 287.0 |
| 30% aqueous solution of hydrogen peroxide | 2.2 |

All of the above ingredients with the exception of one-half (1.1 parts) of the aqueous hydrogen peroxide solution are charged to a reaction vessel as described under Example 7. The mixture is stirred vigorously while heating under reflux on a steam bath for 1½ hours, after which the remainder (1.1 parts) of the aqueous hydrogen peroxide solution is added to the reaction mass. Heating is continued under reflux for an additional 1½ hours, after which steam is passed through the emulsion for 15 to 20 minutes to remove residual monomers.

The emulsion is filtered and then frozen in a bath of acetone and Dry Ice (solid carbon dioxide). About 30 parts of concentrated hydrochloric acid is added to the emulsion, which is then filtered to isolate the copolymer. The filter cake of copolymer is washed with water and dried in a vacuum oven at 50° C. for 48 hours, yielding a dried, reactive copolymer of acrylonitrile and 4-allyloxymethyl-2-oxo-1,3-dioxolane. This reactive copolymer, alone or admixed with a filler, polymerization catalyst or other additive, is adapted to be molded under heat and pressure to yield molded articles of various shapes.

Example 9

|  | Parts |
|---|---|
| Styrene | 190 |
| 4-allyloxymethyl-2-oxo-1,3-dioxolane | 10 |
| Benzoyl peroxide | 1 | yield a clear, viscous copolymer when heated together for 48 hours at 100° C.

Example 10

|  | Parts |
|---|---|
| 2,5-dichlorostyrene | 150 |
| 4-allyloxymethyl-2-oxo-1,3-dioxolane | 50 |
| Benzoyl peroxide | 1 | are mixed and the monomers copolymerized by heating the mixture at 100° C. for 144 hours, yielding a solid copolymer.

Example 11

|  | Parts |
|---|---|
| Styrene | 90.0 |
| Triallyl cyanurate | 5.0 |
| 4-allyloxymethyl-2-oxo-1,3-dioxolane | 5.0 |
| Benzoyl peroxide | 0.5 | are mixed and copolymerization effected between the monomers by heating the mixture for 48 hours at 100° C. A solid copolymer is obtained which swells but does not dissolve when immersed in toluene for several days.

Example 12

|  | Parts |
|---|---|
| Diallyl tetrafluorosuccinate | 190 |
| Triallyl cyanurate | 5 |
| 4-allyloxymethyl-2-oxo-1,3-dioxolane | 5 |
| Benzoyl peroxide | 1 | are heated together for 3 hours at 105° C., yielding an insoluble copolymeric solid. This copolymer supports combustion less readily, that is, it burns more slowly, than polymeric (homopolymeric) diallyl succinate, and is suitable for uses, e. g., in electrically insulating applications, in making flame-resistant laminated articles, etc., for which polymeric diallyl succinate would be either wholly unsuited or would have only limited utility.

Example 13

| | Parts |
|---|---|
| Methyl acrylate | 22.5 |
| Ethyl acrylate | 22.5 |
| 4-allyloxymethyl-2-oxo-1,3-dioxolane | 5.0 |
| 25% solution of dioctyl sodium sulfosuccinate in water | 10.0 |
| Water | 190.0 |
| 30% aqueous solution of hydrogen peroxide | 0.55 |

The same general procedure is followed as described under Example 7. Stirring and heating under reflux are continued for 4½ hours, after which the emulsion is steamed for 1 hour to remove unpolymerized monomers. The resulting product is a fairly stable emulsion of reactive copolymer, which may be used, for example, as a coating composition or as a component of such compositions.

Example 14

| | Parts |
|---|---|
| 2,5-dimethylstyrene | 80.0 |
| 4-allyloxymethyl-2-oxo-1,3-dioxolane | 20.0 |
| Benzoyl peroxide | 0.5 | are mixed together and charged to a heavy-walled glass tube, which thereafter is sealed under vacuum. Polymerization of the polymerizable mixture is allowed to proceed for 400 hours at room temperature (20° to 30° C.) and then for 15 days at 60° C., yielding a hard copolymer of the unsaturated dioxolane and the 2,5-dimethylstyrene.

Example 15

| | Parts |
|---|---|
| Acrylonitrile | 25.0 |
| 4-allyloxymethyl-2-oxo-1,3-dioxolane | 25.0 |
| Benzoyl peroxide | 0.5 | are mixed together and charged to a heavy-walled glass tube, which thereafter is sealed under vacuum. Copolymerization is effected by heating the healed tube in a 60° C. water bath for 40 hours. The resulting copolymer can be molded under heat and pressure to yield a wide variety of molded articles for domestic and industrial uses.

Example 16

| | Parts |
|---|---|
| Methyl methacrylate | 25.0 |
| 4-allyloxymethyl-2-oxo-1,3-dioxolane | 25.0 |
| Benzoyl peroxide | 0.5 |

The same procedure is followed as described under Example 15 with the exception that the period of heating in the 60° C. bath is only 18 hours instead of 40 hours. A hard copolymer of methyl methacrylate and 4-allyloxymethyl-2-oxo-1,3-dioxolane is obtained.

Example 17

| | Parts |
|---|---|
| Vinyl acetate | 25.0 |
| 4-allyloxymethyl-2-oxo-1,3-dioxolane | 25.0 |
| Benzoyl peroxide | 0.5 | yield a very hard copolymer when copolymerized in the same manner as described under Example 16.

Example 18

| | Parts |
|---|---|
| Vinylidene chloride | 25.0 |
| 4-allyloxymethyl-2-oxo-1,3-dioxolane | 25.0 |
| Benzoyl peroxide | 0.5 | yield a clear, homogeneous, very pale yellow copolymer when copolymerized in the same manner as described under Example 16.

Example 19

| | Parts |
|---|---|
| 4-allyloxymethyl-2-oxo-1,3-dioxolane | 10.0 |
| Styrene | 10.0 |
| Xylene | 20.0 |
| 2,2-bis(di-tert.-butyl peroxy-butane | 0.2 | are heated together under reflux at the boiling temperature of the mass for 5 hours, yielding a homogeneous, slightly viscous solution of the copolymer of the unsaturated dioxolane and styrene. The yield of copolymer solids, as determined by oven drying a sample for 2 hours at 150° C., is 30.6%, which corresponds to 71.2% conversion of monomers to copolymer. Films dried from the xylene solution of the copolymer are clear and tough. Their solvent resistance can be increased by incorporating therein a small amount, e. g., from 1 to 5% by weight of the copolymer solids, of a polyamine such, for instance, as ethylene diamine into the copolymer solution prior to drying.

Example 20

| | Parts |
|---|---|
| 4-allyloxymethyl-2-oxo-1,3-dioxolane | 10.0 |
| Ethyl acrylate | 10.0 |
| Benzene | 20.0 |
| Benzoyl peroxide | 0.2 | are heated together under reflux for 5 hours as described in the preceding example, yielding a clear, moderately viscous solution of the unsaturated dioxolane-ethyl acrylate copolymer. From the weight of the copolymer solids, obtained as described in Example 19, it was calculated that the conversion of monomers to copolymer was 71%. Films obtained by drying the benzene solution are clear and tough, and their solvent resistance can be improved in the same manner as mentioned under Example 19 with reference to films produced from the copolymer solution of that example.

Example 21

| | Parts |
|---|---|
| 4-allyloxymethyl-2-oxo-1,3-dioxolane | 20.0 |
| Ethyl acrylate | 27.0 |
| Styrene | 13.0 |
| Xylene | 60.0 |
| 2,2-bis(di-tert.-butyl peroxy)butane | 0.6 | are heated together under reflux as described in Example 19, yielding a viscous solution of the unsaturated dioxolane-ethyl acrylate-styrene copolymer. The weight of the copolymer solids, as determined by oven drying a sample for 1¾ hours at 150° C., is 40.7 parts, which corresponds to a conversion of 81.4% of monomers to copolymer. The dried films are clear and tough, and they can be made more solvent-resistant by adding to the solution, prior to drying, a small amount of tetraethylenepentamine, ethylene diamine or other polyamine.

Example 22

| | Parts |
|---|---|
| Sodium lauryl sulfate | 1.5 |
| Ammonium persulfate, $(NH_4)_2S_2O_8$ | 0.5 |
| Deionized water | 300.0 | are mixed together, and then there is added thereto a solution of

| | Parts |
|---|---|
| 4-allyloxymethyl-2-oxo-1,3-dioxolane | 10 |
| Ethyl acrylate | 90 |

The resulting mixture is heated with stirring in a reaction vessel placed on a steam bath for 1 hour and 35 minutes, after which stirring is stopped and steam is passed rapidly through the mass for 15 minutes in order to remove unreacted monomers. The steamed emulsion is cooled and strained to remove lumps of coagulated copolymer. The conversion of monomers to copolymer is about 91%. A portion of the emulsion is diluted with water to 10% solids and is used to impregnate woolen fabrics. The impregnated cloth is dried for 10 minutes at 300° F. and is tested for shrinkage after being given five successive standard washings in a soap solution. The treated wool shrinks about 11.4%, whereas the untreated wool shrinks about 17%.

Similar results are obtained when the aforementioned monomers are used in the ratio of 25 parts of 4-allyloxymethyl-2-oxo-1,3-dioxolane to 75 parts of ethyl acrylate, the conversion to copolymer in this case being about 76%.

*Example 23*

|   | Parts |
|---|---|
| Acrylonitrile | 25.0 |
| 4-allyloxymethyl-2-oxo-1,3-dioxolane | 25.0 |
| Benzene | 50.0 |
| Benzoyl peroxide | 0.5 | are heated together under reflux at the boiling temperature of the mass for 5 hours. At the end of this period the entire mass is somewhat gummy, and from it a solid copolymer of acrylonitrile and 4-allyloxymethyl-2-oxo-1,3-dioxolane can be isolated by evaporating or distilling off the benzene.

It will be understood, of course, by those skilled in the art that our invention is not limited to the specific ingredients named in the above illustrative examples nor to the particular proportions and methods of polymerization and copolymerization mentioned therein. Thus, instead of benzoyl peroxide and the other catalysts named in the different examples, any other polymerization catalyst or combination of polymerization catalysts, numerous examples of which have been given hereinbefore, may be used. Other catalysts that can be employed are other salts of per-acids, e. g., sodium and potassium persulfates, sodium and potassium percarbonates, sodium and potassium perborates, sodium and potassum perphosphates, etc. Also, instead of using the unsaturated dioxolane and the other comonomer or comonomers in the particular proportions given in the various examples, they can be used in any other proportions, as desired or as conditions may require, for instance in the proportions mentioned by way of illustration in the portion of the specification prior to the examples, and also under Example 4 with particular reference to acrylate comonomers.

A comonomer (or plurality of comonomers) which contains one or more $CH_2=C<$ groupings, which is different from the unsaturated dioxolane and which is compatible and copolymerizable therewith, other than the particular comonomers given in the above illustrative examples, also can be used. For instance, the comonomer may be a cyanoalkyl ester of an acrylic acid, e. g., mono-, di- and tricyanomethyl esters of acrylic acid, methacrylic acid, etc., the mono-, di- and tri-(β-cyanoethyl) esters of acrylic acid, methacrylic acid, etc. Or, the comonomer can be any other organic compound which is copolymerizable with the unsaturated dioxolane and which is represented by the general formula IV 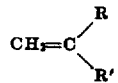

where R represents a member of the class consisting of hydrogen, halogen (chlorine, fluorine, bromine or iodine), alkyl (e. g., methyl, ethyl, propyl, butyl to octadecyl, inclusive), including cycloalkyl (e. g., cyclohexyl, etc.), aryl (e. g., phenyl, xenyl, naphthyl, etc.), alkaryl (e. g., tolyl xylyl, ethylphenyl, etc.), aralkyl (e. g., benzyl, phenylethyl, etc.) and R' represents an aryl radical or a radical represented by the formula (a) 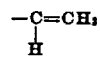

(b) 

(c) 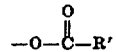

(d) 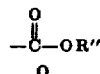

(e) 

where R" represents an alkyl, alkoxyalkyl (e. g., methoxymethyl, methoxyethyl, ethoxyethyl, ethoxypropyl, propoxybutyl, etc.) or a carbocyclic radical (e. g., aryl, alkaryl, hydroaromatic, etc.). Examples of compounds embraced by Formula IV are the vinyl esters (e. g., vinyl acetate, etc.), methyl vinyl ketone, isoprene, 1,3-butadiene, 2-chloro-1,3-butadiene, acrylonitrile, various esters of acrylic acid (e. g., methyl acrylate, ethyl acrylate, cyclohexyl acrylate, tetrahydronaphthyl acrylate, decahydronaphthyl acrylate, methoxyethyl acrylate, ethoxyethyl acrylate, etc.), as well as others that will be obvious to those skilled in the art.

The thermosetting or potentially thermosetting, reactive polymerization products (polymer and copolymers) of this invention have a wide variety of applications. For instance, with or without a filler or other additive, numerous examples of which have been given hereinbefore, they may be used as molding compositions (or as components of molding compositions) from which molded articles are produced by molding the composition under heat and pressure, e. g., at temperatures of the order of 120° to 200° C. and under pressures ranging between 1000 and 10,000 pounds per square inch. Among the fillers that can be employed in the production of molding compositions are alpha-cellulose pulp, asbestos fibers, cotton flock, chopped cloth cuttings, glass fibers, wood flour, antimony oxide, titanium dioxide, sand, clay, mica, dust, diatomaceous earth, etc.

The liquid polymerizable compositions of our invention also can be used in the production of castings; as adhesives, for instance in the production of optical devices containing a plurality of elements, examples of which are compound lenses, compound prisms, Nicol prisms, etc.; in the treatment of paper or paper stock; and for various other purposes.

We claim:

1. 4-allyloxymethyl-2-oxo-1,3-dioxolane.

2. Polymeric 4-allyloxymethyl-2-oxo-1,3-dioxolane.

3. A polymerizable composition comprising (1) 4-allyloxymethyl-2-oxo-1,3-dioxolane and (2) a compound which is different from the compound of (1), is copolymerizable therewith and which contains a $CH_2=C<$ grouping.

4. A composition comprising a copolymer of copolymerizable ingredients including (1) 4-allyloxymethyl-2-oxo-1,3-dioxolane and (2) a compound which is different from the compound of (1), is copolymerizable therewith and which contains a $CH_2=C<$ grouping.

5. A composition as in claim 4 wherein the compound of (2) is a vinyl compound.

6. A composition as in claim 5 wherein the vinyl compound is a vinyl aromatic compound.

7. A composition as in claim 6 wherein the vinyl aromatic compound is a vinyl aromatic hydrocarbon.

8. A composition as in claim 7 wherein the vinyl aromatic hydrocarbon is styrene.

9. A composition as in claim 5 wherein the vinyl compound is a vinyl aliphatic compound.

10. A composition as in claim 9 wherein the vinyl aliphatic compound is acrylonitrile.

11. A composition as in claim 9 wherein the vinyl aliphatic compound is an alkyl ester of acrylic acid.

12. A composition as in claim 11 wherein the alkyl ester of acrylic acid is ethyl acrylate.

13. The method of preparing 4-allyloxymethyl-2-oxo-1,3-dioxolane which comprises effecting reaction under heat between glycerol-α-allyl ether and diethyl carbonate in the presence of a catalyst for the reaction, and isolating 4-allyloxymethyl-2-oxo-1,3-dioxolane from the resulting reaction mass.

14. A method as in claim 13 wherein the catalyst is metallic sodium.

15. The method of preparing a new synthetic composition which comprises polymerizing 4-allyloxymethyl-2-oxo-1,3-dioxolane under heat while admixed with a polymerization catalyst.

16. The method of preparing a new synthetic composition which comprises polymerizing, under heat and while admixed with a polymerization catalyst, a polymerizable composition comprising (1) 4-allyloxy-methyl-2-oxo-1,3-dioxolane and (2) a compound which is different from the compound of (1), is copolymerizable therewith and which contains a $CH_2=C<$ grouping.

EDWARD L. KROPA.
WALTER M. THOMAS.

REFERENCES CITED

The following references are of record in the file of this patent:

UNITED STATES PATENTS

| Number | Name | Date |
| --- | --- | --- |
| 2,098,108 | Reppe | Nov. 2, 1937 |